July 1, 1930. H. L. WINKIE 1,769,668
ADAPTABLE COFFEEPOT HANDLE
Filed Dec. 7, 1929
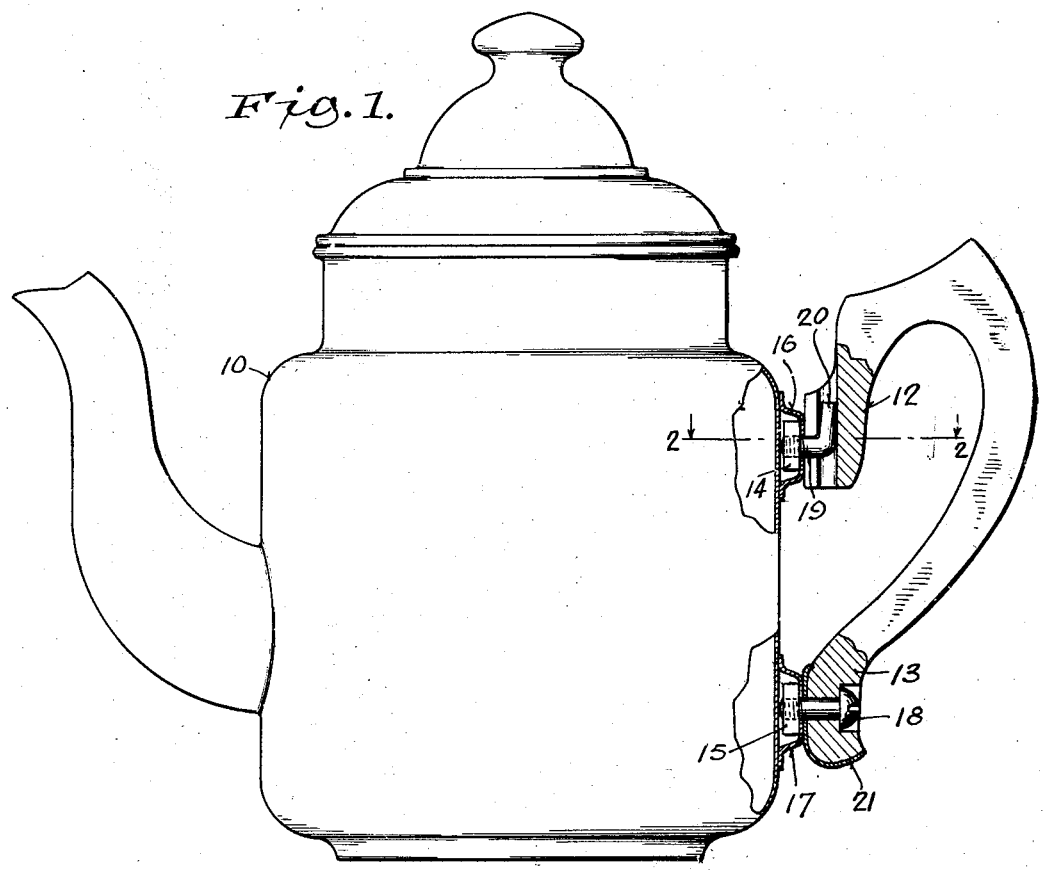
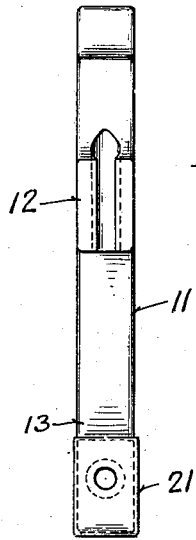
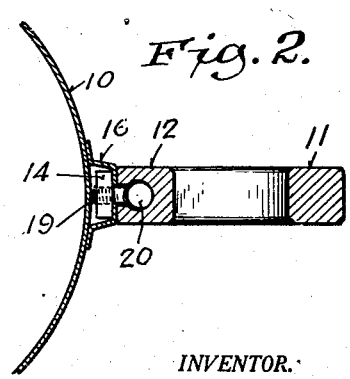
INVENTOR.
Hallock L. Winkie
BY
ATTORNEY.

Patented July 1, 1930

1,769,668

UNITED STATES PATENT OFFICE

HALLOCK L. WINKIE, OF MILWAUKEE, WISCONSIN

ADAPTABLE COFFEEPOT HANDLE

Application filed December 7, 1929. Serial No. 412,422.

The present invention relates to an improved construction of a replacement handle for a coffee-pot, and it embodies features which render the handle readily adaptable to coffee pots of different sizes.

In practice, the handles of such pots require replacement periodically, and in view of the different sizes and constructions of coffee-pots now on the market, it is necessary that the dealer carry in stock a supply of handles of different sizes, in order to meet the demands of the trade.

Ordinarily, the two fixing bolts by means of which the handle is attached to the pot, are spaced different distances apart in coffee-pots of different manufacture. The bolt holes in the different handles likewise vary in their spacing, so that it is necessary to select a particular handle, and one which will line up with the construction of the pot, when replacement becomes necessary.

My invention obviates the necessity for carrying in stock pot handles of different sizes, inasmuch as the improved handle embodying the invention has a range of adaptability which will permit its application to various coffee-pots in which the points of connection of the handles depart in considerable degree from what may be regarded as a standardization.

Having thus outlined the nature and purposes of my invention, I will now proceed to describe the construction illustrated, and in the appended claims will point out the novelty residing in the invention.

In the accompanying drawing:

Figure 1 is a view in elevation of a coffee-pot of the popular percolator type, showing my invention as applied thereto, some parts being shown in section for the purpose of clearness.

Fig. 2 is a horizontal sectional view on the line 2—2, Fig. 1, of a portion of a coffee-pot, and illustrating more clearly the manner of engagement of the upper bolt.

Fig. 3 is a rear edge view of the handle, looking from the right in Fig. 1.

The invention is particularly adapted for use in connection with straight-bodied coffee-pots of the percolator type, as shown in Fig. 1 of the drawing, in which the numeral 10 indicates any usual coffee-pot of the type referred to. The handle is attached to the pot on the side which is opposite the spout, as is usual in such constructions. The handle shown is merely conventional, but in whatever shape it may be made, it will present a gripping part 11, from which will project inwardly free upper and lower ends 12 and 13, respectively, through which attachment to the pot 10 will be made.

Perforated and threaded elements, as nuts 14 and 15, are arranged as permanent parts of the coffee-pot. I have shown such nuts as enclosed within dished embossments 16 and 17, which may be soldered or welded at their flanged margins to the pot; or such embossments may be struck out from the pot.

The connection of the lower end 13 of the handle to the pot may be as usual, in which the point of a headed screw 18, passed into a counter-bored hole in the said lower end, is engaged in the threaded nut 15, to bolt that portion of the handle to the pot.

The range of adaptability before referred to, resides in the means provided for connection of the upper end of the handle to the pot. Instead of effecting such connection through a like screw 18, I form a special bolt of the angular form shown. The horizontal arm 19 of the said bolt is threaded for engagement in the nut 14. The other arm 20 of the angular bolt, and of larger diameter, stands vertically with respect to the threaded arm 19. The angularity of the arms is slightly more than 90°, for a purpose which later will be described.

Instead of boring the upper end 12 of the handle transversely, I provide in such upper end a vertical slot of key-hole cross section, the choked part of the slot opening outwardly to the rear face of the handle. The enlargement of the arm 20 of the angular bolt acts as a T or cross-head, to anchor the bolt in the key-hole slot.

In applying my improved handle to a coffee pot, first detaching the old handle, I engage the threaded smaller arm 19 of the angular bolt with the nut 14, with the larger arm 20 extending either upwardly or downwardly, as may be required for the correct positioning of the key-hole slot in the upper end 12 of the handle thereover. The special bolt should be screwed into the nut far enough to place the bolt under tension, when the slotted end 12 of the handle is slipped thereover, due to the angularity existing in the bolt. The handle is moved until the counter-bored hole in the lower end 13 of the handle is aligned with the threaded nut 15, and the screw 18 is inserted and turned to bolt the lower end 13 of the handle to the coffee-pot.

A heat deflector 21, of metal, should encase the lower end 13 of the handle, to protect the latter from burning.

Having thus described my invention, what I claim and desire to secure by Letters Patent of the United States, is:

1. A coffee-pot provided with means at spaced points for attachment of a handle thereto, in combination with a handle constructed with attaching ends abutting such spaced points, and means for connecting the handle to the pot, such means including a vertically disposed key-hole slot in one of the ends of the handle, and an angular bolt one arm of which engages one of the spaced means on the pot and the other arm of which, diverging from parallelism with the axis of the slot, is engaged in the said slot to place the bolt under tension when the handle is attached to the pot.

2. A coffee-pot provided with means at spaced points for attachment of a handle thereto, in combination with a handle constructed with attaching ends abutting such spaced points, and means for connecting the handle to the pot, such means including a vertically disposed key-hole slot in one of the ends of the handle, and an angular bolt one arm of which of lesser diameter engages one of the spaced means on the pot and the other arm of which, diverging from parallelism with the axis of the slot, and of larger diameter, is engaged in the said slot to place the bolt under tension when the handle is applied to the pot.

3. A coffee-pot provided with means at vertically spaced points for attachment of a handle thereto, in combination with a handle constructed with attaching ends abutting such spaced points, and means for connecting the handle to the pot, such means including a vertically disposed key-hole slot in the upper end of the handle, and an angular bolt one arm of which of smaller diameter engages the upper one of the spaced means on the pot and the other arm of which, diverging from parallelism with the axis of the slot, and of larger diameter is engaged in the said slot to place the bolt under tension when the handle is applied to the pot.

4. A coffee-pot provided with means at spaced points for attachment of a handle thereto, in combination with a handle constructed with attaching ends abutting such spaced points, and means for connecting the handle to the pot, such means including a vertically disposed key-hole slot in one of the ends of the handle, and an angular bolt one arm of which engages one of the spaced means on the pot and the other arm of which, diverging from parallelism with the axis of the slot, is engaged in the said slot to place the bolt under tension, whereby the adjustment of the relation of the slot and the bolt permits the application of the handle to pots in which in the points of attachment on the pot vary in their spacing.

In testimony whereof, I have signed my name at Milwaukee, Wisconsin, this 8th day of November, 1929.

H. L. WINKIE.